United States Patent [19]
Cwynar et al.

[11] Patent Number: 5,528,686
[45] Date of Patent: Jun. 18, 1996

[54] TRANSFORMERLESS HYBRID CIRCUIT HAVING DIRECT POWERED LINE-SIDE AMPLIFIERS

[75] Inventors: Donald T. Cwynar, Reading; Donald R. Laturell, Allentown, both of Pa.

[73] Assignee: AT&T Corp., Murray Hill, N.J.

[21] Appl. No.: 272,501

[22] Filed: Jul. 8, 1994

[51] Int. Cl.$^6$ .................................................. H04M 19/00
[52] U.S. Cl. ............................................. 379/405; 379/391
[58] Field of Search ........................... 379/391, 395, 379/402, 405, 412, 413

[56] References Cited

U.S. PATENT DOCUMENTS

| | | | |
|---|---|---|---|
| 4,056,719 | 11/1977 | Waaben | 250/199 |
| 4,331,842 | 5/1982 | Kiko | 379/398 |
| 4,479,066 | 10/1984 | Embree | 307/350 |
| 4,514,595 | 4/1985 | Rosenbaum | 379/400 |
| 4,757,528 | 9/1986 | Falater et al. | 379/412 |
| 5,245,654 | 9/1993 | Wilkison | 379/405 |
| 5,280,526 | 1/1994 | Laturell | 379/408 |

FOREIGN PATENT DOCUMENTS 572175  5/1993  European Pat. Off. ....... H04M 19/00

OTHER PUBLICATIONS

AT&T Microelectronics Interface Circuit for Optically Coupled Data Access Arrangements.

*Primary Examiner*—Jeffery Hofsass
*Assistant Examiner*—Thomas F. Presson
*Attorney, Agent, or Firm*—Scott W. McLellan

[57] ABSTRACT

A telephone line-powered Data Access Arrangement having amplifiers therein directly powered from the telephone line without voltage regulators or filters. The amplifiers, such as the amplifier driving an LED in an optical isolator, draw a constant power supply current independent of the signal being amplified. Thus, amplified signals are not coupled back onto the telephone line.

8 Claims, 2 Drawing Sheets

TRANSFORMERLESS HYBRID CIRCUIT HAVING DIRECT POWERED LINE-SIDE AMPLIFIERS

CROSS-REFERENCE TO RELATED APPLICATION

This application is related to a patent application titled "Improved Transformerless Hybrid Circuit", by D. T. Cwynar and D. R. Laturell, Ser. No. 08/272,180, filed simultaneously with, and assigned to the same assignee, as this application.

BACKGROUND OF THE INVENTION

1. Field of the Invention

This invention relates to telephone hybrids in general and, more particularly, to optically isolated hybrids generally used in transformerless Data Access Arrangements.

2. Description of the Prior Art

For purposes here, the term Data Access Arrangement or DAA is used to refer to a transformerless hybrid and isolation means generally, although it is understood that more components may be necessary to form a complete DAA, such as a line switch and loop current control.

See U.S. Pat. No. 5,280,526 assigned to the same assignee as this invention and is included herein by reference. The circuits shown in FIGS. 2 and 3 of the above-identified patent form the hybrid and isolation functions of a Data Access Arrangement (DAA). The disclosed DAA uses conventional operational amplifiers powered from a telephone line connected between terminal 100 and ground (except amplifier 80 in FIG. 3). Added to the DAA is a voltage regulator (Zener diode 71 and resistor 70) and a passive filter arrangement (capacitor 72) to provide a regulated voltage to the amplifiers while decoupling the amplifiers from the telephone line. The filter and regulator are necessary because the amplifiers used are of conventional design, wherein the power supply current consumed by an amplifier varies with the signal amplified by the amplifier. Without the filtering, the varying power supply current can interfere and corrupt the desired signals on the telephone line.

The DAA of the aforementioned U.S. Patent includes a hybrid that couples to the two-wire telephone line. The hybrid converts the two-wire telephone line (bidirectional) path into a unilateral receive path and a unilateral transmit path. Signals arriving on the telephone line pass through the receive path over an optical isolator 44 to a modem 75 or the like. Similarly, signals from a modem 75 or the like pass through the transmit path over another optical isolator 42 and are impressed on the telephone line.

The received signal strength presented to the hybrid from a mismatched telephone line (the telephone line being terminated at the DAA with an impedance different from the match impedance) is usually very weak, typically many tens of decibels below the signal strength of the transmitted signal from the DAA to the telephone line. For the DAA to adequately send the receive signal over the optical isolator 44, a line-powered amplifier 50 amplifies the receive signal and performs part of the hybrid function. An additional line-powered amplifier (not shown but corresponding to amplifier 80 in FIG. 3 except being powered from the telephone line) further amplifies the received signal and drives an LED within the optical isolator 44. As stated above, the amplifiers used in the DAA are of conventional design, i.e., the power supply current varies with the signal being amplified. For the line-powered amplifier driving the LED in isolator 44, variations in the power supply current to the amplifier is approximately the same as the signal to the LED. Thus, without the filter and regulator, variations the power supply currents can interfere with the received signal to the point of making the received signal useless.

The foregoing also applies to the other telephone line-powered amplifiers in the DAA, where variations in power supply current consumption may interfere with the received signal.

Thus, it is desirable to provide a DAA arrangement that allows for direct powering from the telephone line without filtering or voltage regulation.

Further, it is desirable to provide a DAA arrangement with direct telephone line-powered amplifiers that do not significantly introduce undesired signals onto the telephone line.

SUMMARY OF THE INVENTION

This and other aspects of the invention may be obtained generally in a data access arrangement (DAA) having an application portion and a telephone line-side portion galvanically isolated from the application portion by at least one optical coupler with an LED. Both portions have amplifiers therein. The DAA includes a hybrid coupling to the telephone line and a line-side amplifier, responsive to the hybrid, for driving the LED with signals received from the telephone line. The line-side amplifier driving the LED is directly powered from the telephone line and draws a substantially constant power supply current from the telephone line.

Further, all of the line-side amplifiers may be directly powered from the telephone line and draw a substantially constant power supply current from the telephone line.

BRIEF DESCRIPTION OF THE DRAWING

The foregoing features of this invention, as well as the invention itself, may be more fully understood from the following detailed description of the drawings, in which.

DETAILED DESCRIPTION

Figure 1:
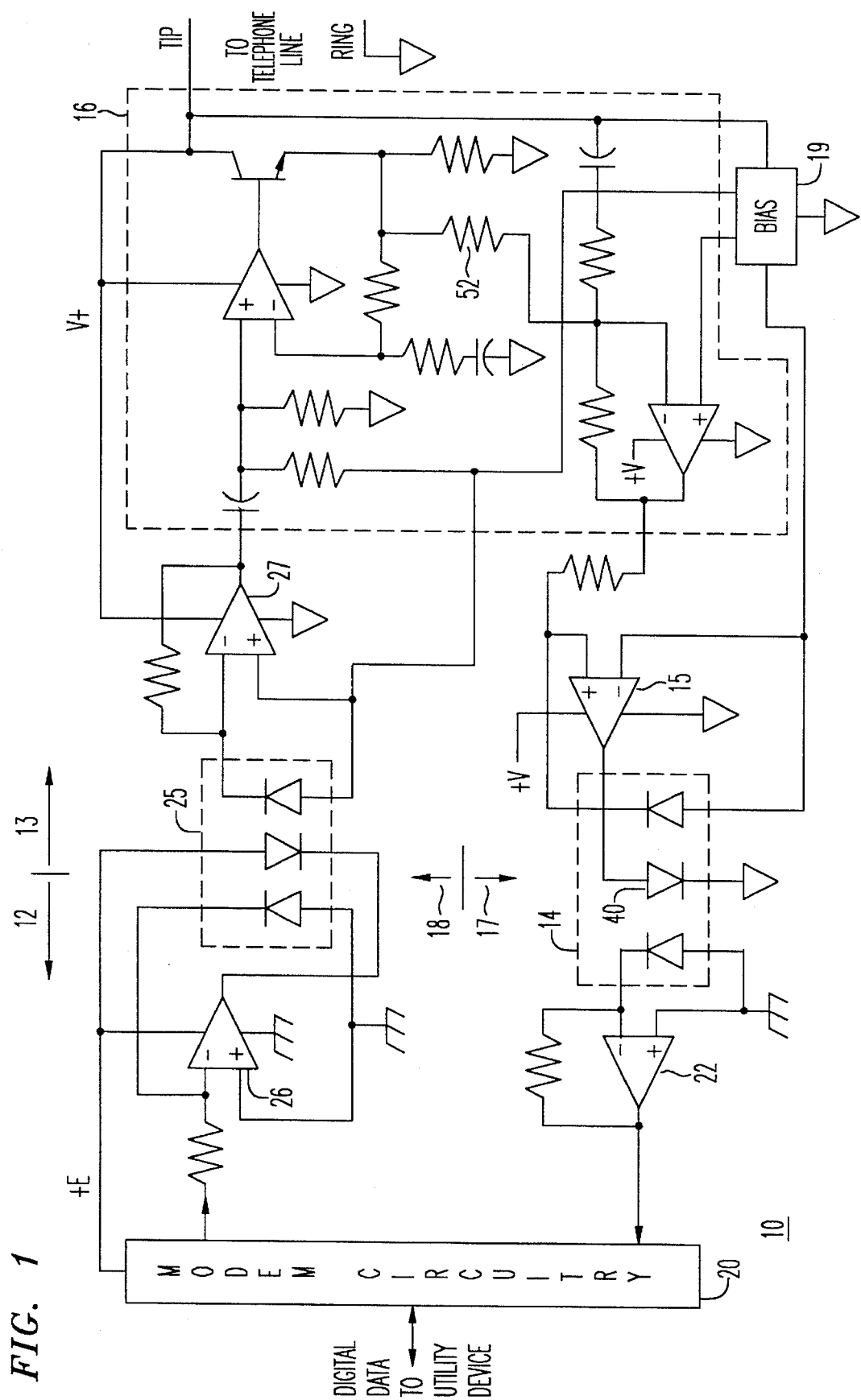
FIG. 1 is a simplified schematic drawing of a DAA according to one exemplary embodiment of the invention.

As discussed below in more detail and in accordance with an embodiment of the invention shown in FIG. 1, the data access arrangement (DAA) 10 has an application portion 12 and a telephone line-side portion 13 galvanically isolated from the application portion 12 by at least one optical coupler 14 with an LED 40. The line-side portion 13 has a hybrid circuit 16 coupling to the telephone line (coupled to TIP and RING) and a line-side amplifier 15, responsive to the hybrid 16, for driving the LED 40 with signals received from the telephone line. The line-side amplifier 15 is directly powered from the telephone line and draws a substantially constant power supply current from the telephone line.

In more detail, the DAA 10 in FIG. 1 has an application portion 12 and a telephone line-side portion 13. Both portions 12, 13 have a receive path 17 and a transmit path 18. The receive path 17 and the transmit path 18 are each unilateral paths from and to the hybrid 16. Hybrid 16 couples to the two-wire telephone line (a bidirectional path)

and acts as a two-wire to four-wire converter to couple the bidirectional telephone line path to the unilateral receive path 17 and the unilateral transmit path 18. Signals arriving on the telephone line pass through the receive path 17 to the modem circuitry 20. Similarly, signals from a modem 20 pass through the transmit path 18 and are impressed on the telephone line for transmission.

Operation of the hybrid 16 is similar to the Output Driver and Near-end Echo Canceling Subcircuits in the above-referenced patent application. The only substantial difference between what is disclosed here and what is disclosed in the above-referenced patent is the feedback path provided by resistor 52 for canceling the transmitted signal from the received signal. This provides for superior cancellation of the transmitted signal than in the hybrid disclosed in the above-referenced patent.

Galvanic isolation between the portions 12, 13 is accomplished by optical isolation. Optical isolation in the receive path 17 is provided by opto-isolator 14, driver amplifier 15 and photodetector amplifier 22. Similarly, in the transmit path 18, optical isolation is provided by opto-isolator 25, driver amplifier 26, and photodiode amplifier 27. The operation of the above is similar to that described in connection with FIG. 3 of the above-referenced patent. An exemplary opto-isolator having an LED light source and two photodiodes is a Siemens IL-300 opto-isolator.

Bias circuit 19 provides substantially invariant bias voltages and currents to the various circuits in the DAA 10. In this exemplary embodiment, the circuitry in the circuit 19 is of conventional design, having a self-biasing cascode current source (not shown) driving a bandgap voltage reference (not shown) to provide the substantially invariant voltages and currents, referenced to ground.

The amplifiers on the application portion 12 (here amplifiers 22 and 26) are powered from, for example, an exemplary modem circuit 20. In contrast, the amplifiers on the line-side portion 13 (here amplifiers 15, 27 and those in the hybrid 16) are powered directly from the telephone line. No voltage regulation or passive filtering is provided or needed, although it is understood that regulation or filtering may be provided if desired. To allow for the direct powering of the amplifiers by telephone line current, the amplifiers should not draw a supply current that varies with the signal amplified.

Figure 2:
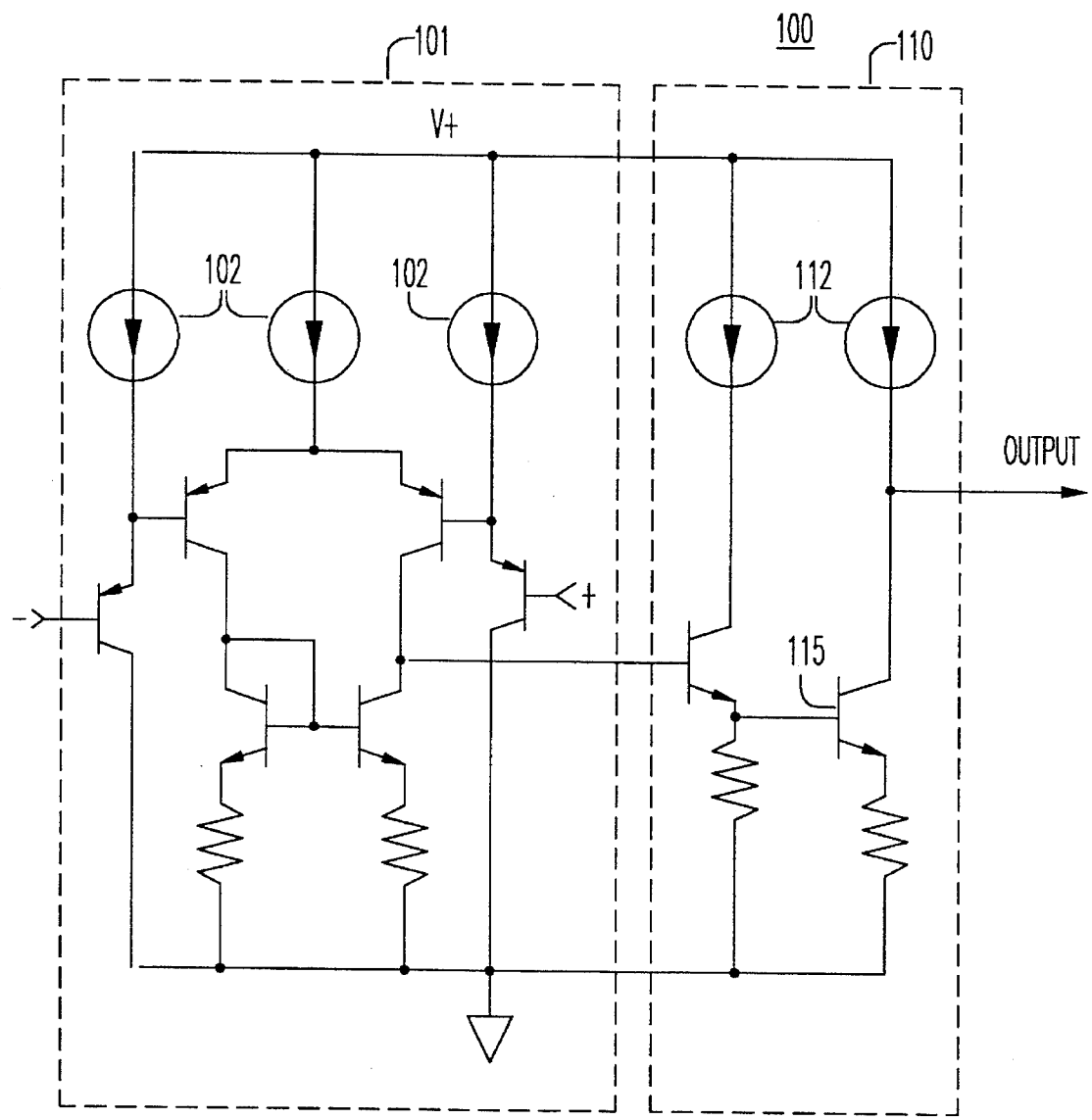
FIG. 2 is a simplified schematic diagram of an exemplary line-side amplifier, according an exemplary embodiment of the invention.

In FIG. 2 an exemplary amplifier 100 which has a substantially constant power supply current consumption is shown. The amplifier has a differential input stage 101 and an output stage 110. The input stage 101 has a high power supply noise immunity and is shown being powered from the V+ power supply bus (which is connected to the telephone line in FIG. 1) by constant current sources 102. The output stage 110 is powered from the V+ supply bus by constant current sources 112. Advantageously, the constant current sources 102, 112 makes the power supply current consumption of the amplifier 100 substantially independent of the signal being amplified thereby. Moreover, the amplifier 100 operates totally in the class-A mode which provides for very linear operation and low distortion, unlike prior art amplifiers which typically have class-AB or -B output stages with cross-over distortion.

Using the exemplary amplifier 100 as the LED 40 driver in the receive path 17 (FIG. 1), varying signal current to the LED 40 does not get applied to the telephone line current because of the current sources 112 providing a fixed current. Current through the LED 40 varies with the desired signal in response to current shunted away from the LED 40 by output transistor 115. Thus, the amplified receive signal presented to LED 40 does not appreciably affect signals on the telephone line. Moreover, if all of the line-side portion 13 amplifiers are of the same or similar design as that shown in FIG. 2, then virtually no signals amplified by the line-side portion 13 amplifiers will affect the desired signals on the telephone line.

Amplifiers in the application portion 12 of the DAA 10 may also be of the type shown in FIG. 2. However, more conventional amplifiers may be used there because of the usual availability of a regulated and filtered power supply voltage E+.

Except for the optical isolators 14, 15, all of the circuitry shown in the line-side portion 13 of the DAA 10 has been implemented on a single chip.

While a modem circuit is shown as the application for the disclosed DAA 10 (FIG. 1), it is understood that other uses may be found for the disclosed invention, such as facsimile machines, phone patches, answering machines, etc.

Having described the preferred embodiment of this invention, it will now be apparent to one of skill in the art that other embodiments incorporating its concept may be used. Therefore, this invention should not be limited to the disclosed embodiment, but rather should be limited only by the spirit and scope of the appended claims.

We claim:

1. A data access arrangement (DAA) having an application portion and a telephone line-side portion galvanically isolated from the application portion by at least one optical coupler with an LED, both portions having amplifiers therein, the line-side portion having:

a hybrid coupling to the telephone line; and a line-side amplifier, responsive to the hybrid, for driving the LED with signals received from the telephone line;

wherein the DAA is CHARACTERIZED BY the line-side amplifier driving the LED is directly powered from the telephone line and draws a substantially constant power supply current from the telephone line.

2. The DAA recited in claim 1, wherein all of the line-side amplifiers are directly powered from the telephone line and draw a substantially constant power supply current from the telephone line.

3. The DAA recited in claim 2, wherein each of the line-side amplifiers has a differential input stage with differential inputs, an output stage connected to an output, and a power supply terminal, the output stage being CHARACTERIZED BY:

a fixed current source connected between the power supply terminal and the output; and a variable current sink, responsive to the input stage, connected to the output.

4. The amplifier as recited in claim 3, wherein the input stage is coupled to the power supply terminal by at least one fixed current source, such that the current consumption of the input stage is substantially invariant.

5. The DAA recited in claim 4, wherein the optical coupler has therein a photodiode responsive to the LED and disposed across the differential inputs of the line-side amplifier driving the LED.

6. The DAA recited in claim 5, wherein the hybrid forms a receive path and a transmit path, and the optical coupler is disposed in the receive path of the DAA.

7. The DAA recited in claim 6, further comprising an additional optical isolator disposed in the transmit path of the DAA.

8. A modem, coupling to the transmit and receive paths of the DAA recited in claim 7.

* * * * *